(12) United States Patent
Nishiwaki et al.

(10) Patent No.: US 6,644,892 B2
(45) Date of Patent: Nov. 11, 2003

(54) METHOD FOR ATTACHING CABLE AND CABLE HOLDER

(75) Inventors: Masaaki Nishiwaki, Tokyo (JP); Akira Kobayashi, Hiroshima (JP)

(73) Assignees: NihonHume Corporation, Tokyo (JP); Consec Corporation, Hiroshima (JP)

( * ) Notice: Subject to any disclaimer, the term of this patent is extended or adjusted under 35 U.S.C. 154(b) by 0 days.

(21) Appl. No.: 09/877,707

(22) Filed: Jun. 8, 2001

(65) Prior Publication Data

US 2002/0187008 A1 Dec. 12, 2002

(51) Int. Cl.⁷ .............................. H02G 1/00; H02G 9/06
(52) U.S. Cl. .................... 405/184.4; 248/71; 248/74.2; 248/74.1; 174/40 CC
(58) Field of Search .................. 248/49, 71, 74.1, 248/74.2; 405/184.4; 174/84 C, 135, 40 CC, 99 R, 164, 163 R

(56) References Cited

U.S. PATENT DOCUMENTS

| | | | | |
|---|---|---|---|---|
| 3,905,570 A | * | 9/1975 | Nieuwveld | 248/71 |
| 4,786,088 A | * | 11/1988 | Ziu | 285/138 |
| 5,018,260 A | * | 5/1991 | Ziu | 248/74.2 |
| 5,575,558 A | * | 11/1996 | Coushaine et al. | 362/396 |
| 6,418,591 B1 | * | 7/2002 | Hecht et al. | 24/19 |
| 6,439,809 B1 | * | 8/2002 | Hecht et al. | 405/184.4 |

FOREIGN PATENT DOCUMENTS

| | | | |
|---|---|---|---|
| JP | 10-66238 | * | 3/1998 |
| JP | 2000-261924 | * | 9/2000 |
| JP | 2001-275219 | * | 10/2001 |

* cited by examiner

*Primary Examiner*—Heather Shackelford
*Assistant Examiner*—Sunil Singh
(74) *Attorney, Agent, or Firm*—Flynn, Thiel, Boutell & Tanis, P.C.

(57) ABSTRACT

A cable holder is deposited and fixed on an inner wall of a sewage pipe made of resin and supports an optical fiber for communication, which is passed through the pipe. The cable holder has a longitudinal section similar to that of an inverted pot and a narrowed inlet opening, and is provided with a pair of claws arranged in the axial direction of a pipe at its upper part. A cable holder driving device is raised in a state where the cable holder is heated and a pair of claws are pressure-fitted into the inner wall of the pipe. The pressure-fitting is carried out to such a degree that the cable fitted to and supported by the cable holder is brought into contact with the inner wall of the pipe. After the cable holder is cooled down and fixed, the cable passed through the pipe is pushed in the cable holder through its inlet opening.

3 Claims, 9 Drawing Sheets

METHOD FOR ATTACHING CABLE AND CABLE HOLDER

BACKGROUND OF THE INVENTION

The present invention relates to a method for attaching a cable for communication optical fibers, etc., which are dragged into pipes such as sewage pipes made of resin, and a cable holder used for the method.

Optical fibers for communications that are able to transmit a great deal of information at high accuracy without being influenced by electric hindrance have recently spread as communication networks in line with quick advancement of information society. There are many cases where such communication networks are laid in the existing sewage pipes in the case of city zones. Where optical fibers for communications are laid in sewage pipes, cables consisting of optical fibers are usually attached to the ceiling of a sewage pipe by cable holders so that a water flow is not hindered due to foreign substances being adhered thereto and being accumulated therein.

As such a method for attaching a cable, some methods have been publicly known, one of which is, as disclosed by Japanese Patent Publication No. Hei-3-50483, a method for attaching a cable, wherein a drilling device incorporated in a work carriage traveling in a pipe such as a sewage pipe drills a pair of holes on the inner wall of the pipe, the legs of a roughly U-shaped cable holder are driven into the respective holes by a driving device incorporated in the work carriage after the cable is grasped by the cable holder, another of which is, as disclosed by Japanese Unexamined Patent Publication No. 8-103012, a method in which, by using a cable holder having a laterally faced hook-shaped cable retainer at its upper and lower parts thereof, after the cable holder-attached portion is pushed, by a drilling device, in the holes drilled in the inner wall of a pipe and is adhered thereinto, the cable is grasped by a cable catcher of a subsequently coming work carriage and the cable is caught in the cable retaining portion, and the other of which is, as disclosed by Japanese Unexamined Patent Publication Nos. 2000-261924 and 2001-28819, a method having a cable for attaching a cable, which is caught by a cable catcher incorporated in a work carriage traveling in a pipe, by pushing the same in a cable holder retaining portion which has a cable retaining portion and fixes the upper attaching portion thereof by screwing or burying the upper attached portion in the inner wall of the pipe, wherein the cable retaining portion has such a section having an inlet opening facing downward, in which a pot is turned upside down. In addition, Japanese Unexamined Patent Publication No. Hei-10-66238 disclosed a method in which, as a cable holder to be attached to a resin pipe such as a vinyl chloride pipe, etc., an attaching portion is driven in the resin pipe while being heated by supplying an electric current, wherein the attaching portion is deposited and fixed thereat.

Wherein the pipe is a resin pipe such as a vinyl chloride pipe, etc., it is difficult to drill holes by a drilling device in comparison with ceramic pipes or Hume pipes, wherein there is a fear that such a resin pipe is damaged or broken when drilling by the drilling device. However, if the attaching portion is heated, deposited and fixed in a resin pipe, the above-described problem does not occur. But, the method for attaching a cable as shown in Japanese Unexamined Patent Publication No. Hei-10-66238 is constructed so that the attaching portion is heated and is driven into a resin pipe, and the attaching portion is deposited and fixed in a position. Therefore, if the performance guarantee temperature of cables is comparatively low to be 60° C. as in optical fibers, the cable may be subjected to thermal influences and the temperature thereof may exceed its performance guarantee level when heating the attaching portion for fixing.

SUMMARY OF THE INVENTION

It is therefore an object of the invention to provide a method for attaching a cable, by which the cable is not subjected to any thermal influence when depositing and fixing a cable holder in a resin pipe.

The method according to the invention is composed so that a cable holder is heated to be deposited and fixed in the inner wall of a resin pipe and, after the cable holder is deposited, fixed and cooled down, a cable is caught by the cable holder, and the method comprises the steps of dragging a cable such as optical fibers for communications into a pipe such as a sewage pipe, etc., which is made of resin such as vinyl chloride, polyester, etc., pressure-fitting, depositing and fixing the attaching portion of a metal-made cable holder on the inner wall of the pipe by heating the attaching portion thereof by a heating means, and engaging the cable passed through the pipe with cable holders after the cable holders deposited and fixed on the inner wall of the pipe are cooled down.

According to the invention, since the cable is engaged with the cable holders after the cable holders are deposited and fixed on the inner wall of a resin pipe and cooled down, the cable is not subjected to any thermal influence.

With the invention, the step of dragging a cable into a pipe such as a sewage pipe may be carried out before or after the step of depositing and fixing the cable holder on the inner wall of the pipe.

A cable holder used for the invention may consist of, for example, an attaching portion 32 having a laterally-faced hook-like part 31 as shown in FIG. 13. Such a type may be employed, in which, after the tip end of the attaching portion is pressure-fitted into a resin pipe 33 and deposited and fixed therein, a cable 34 is pushed in between the inner wall of the resin pipe and the tip end of the hook-like part, and is caught in the hook-like part 31. However, preferably, as shown in FIG. 14, such a type may be employed, in which the hook-like part is just like an inverted pot that has an narrowed inlet opening 36 at its downward side, and after an attaching part 37 projecting upward is pressure-fitted into a resin pipe 38 and deposited and fixed therein, the cable 34 is pushed in from below through the inlet opening for engagement.

In the latter cable holder as shown in FIG. 14, it will become possible to raise the retaining position of the cable 34 and attach the cable 34 in contact with the inner wall of a pipe by strongly pressure-fitting the attaching portion 37 to a resin pipe 38. In the case of a sewage pipe, the clearance between the cable 34 and the inner wall of the pipe can be removed, wherein it is possible to prevent hair and foreign substances contained in filthy water from being accumulated therein.

It is another object of the invention to provide a cable holder, which can be easily pressure-fitted into a resin pipe, and can be securely attached thereto.

A cable holder according to the present invention includes a cable retaining portion with which a cable is engaged, and a claw protruding upward from the cable retaining portion. When attaching the cable holder on a sewage pipe made of resin, the claw is heated by a heating means such as a heater, and is pressure-fitted into the inner wall of the pipe to be deposited and fixed thereon. After that, a cable such as an optical fiber, which is dragged into the pipe such as a sewage pipe is pushed in the cable retaining portion and is engaged therewith.

According to the invention, since the portion to be inserted into the resin pipe is made into a claw, it becomes possible to facilitate the pressure-fitting thereof into the resin pipe.

The above-described claw may be single, but it may be preferably plural. If a plurality of claws are provided, the attaching of the cable holder on the resin pipe can be further stabilized.

Where a plurality of claws are provided, the respective claws may be juxtaposed with a fixed interval in the circumferential direction of the resin pipe. But they are preferably arranged with a fixed interval toward the axial direction of the resin pipe.

In the former case, if the claws are pressure-fitted into the resin pipe in a state where the cable holder is inclined in the left or right direction, a claw at either left or right may be deeply inserted into the resin pipe, and the others are shallowly inserted thereinto, wherein the attaching thereof will not be stabilized. To the contrary, in the latter case, even if the claws are pressure-fitted into the resin pipe in a state where the cable holder is inclined left or right, the claws that are arranged toward the axial direction of a pipe can be inserted into the resin pipe at a uniform depth.

Also, in the present invention, due to the above-described reason, such a type may be used, in which the shape of the cable retaining portion is just like the section of an inverted pot that has a narrowed inlet opening at its downward side, as shown in FIG. 14.

The other objects and advantages of the invention will be made more apparent based on the following description of embodiments thereof with reference to the accompanying drawings.

DESCRIPTION OF THE PREFERRED EMBODIMENT

Figure 1:
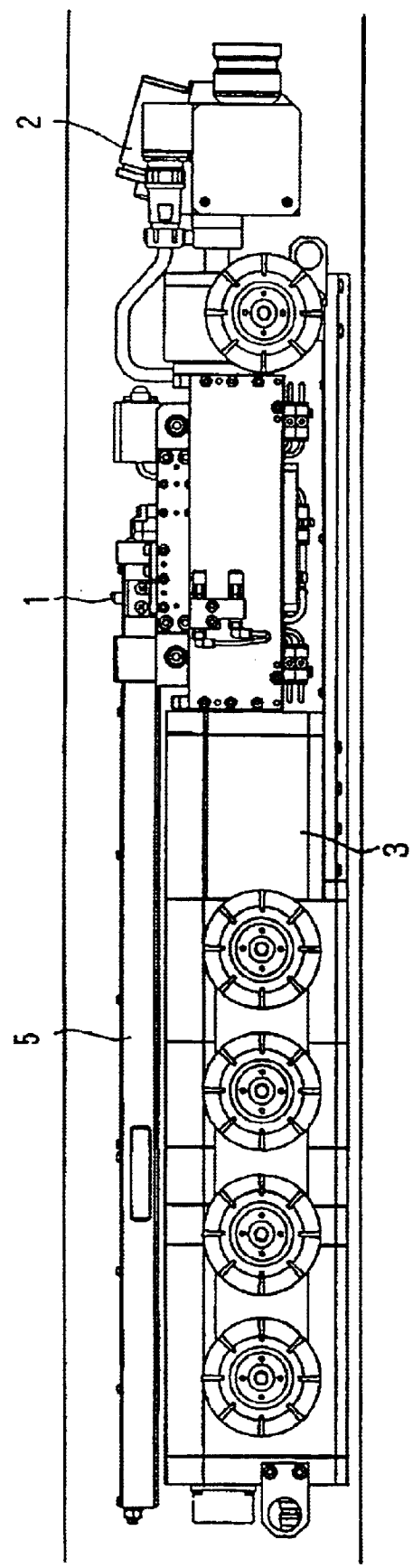
FIG. 1 is a side elevational view of a carriage, which is provided with a driving device of a cable holder and travels in a pipe.
Figure 2:
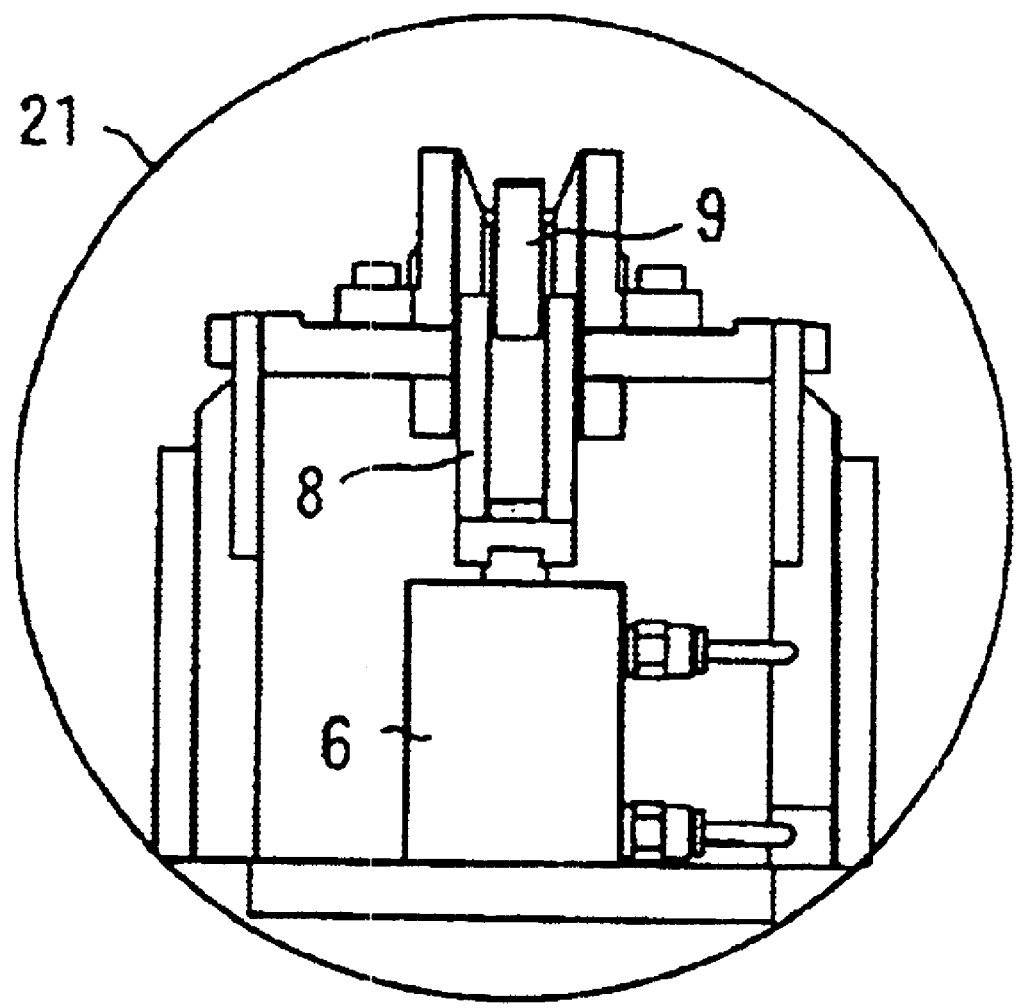
FIG. 2 is a detailed view showing a cable holder driving device.

FIG. 1 shows a carriage 3 that incorporates a cable holder driving device 1 that deposits and fixes a cable holder, described later, by heating it and driving it into the ceiling part of a pipe such as a sewage pipe made of a resin pipe; a monitoring camera 2 that photographs the ceiling part of the pipe and driving device 1, and a light (not illustrated) that is incorporated behind the monitoring camera 2 and lights up the ceiling part of the pipe and the driving device 1, wherein the cable holder driving device 1 comprises a cartridge 5 for storing cable holders, a supporter 8, which, as shown in FIG. 2, is elevatable by a pneumatic cylinder 6 and supports a cable holder 7 pushed out by the cartridge 5, a rod-like striker 9, which is elevatable by another pneumatic cylinder (not illustrated) and drives a cable holder 7 supported by the supporter 8 into the ceiling part of a pipe, and a heater (not illustrated), which is elevatable integrally with the corresponding striker 9, and heats the striker 9, as in the device disclosed by Japanese Unexamined Patent Publication No. Hei-10-66238.

Figure 3:
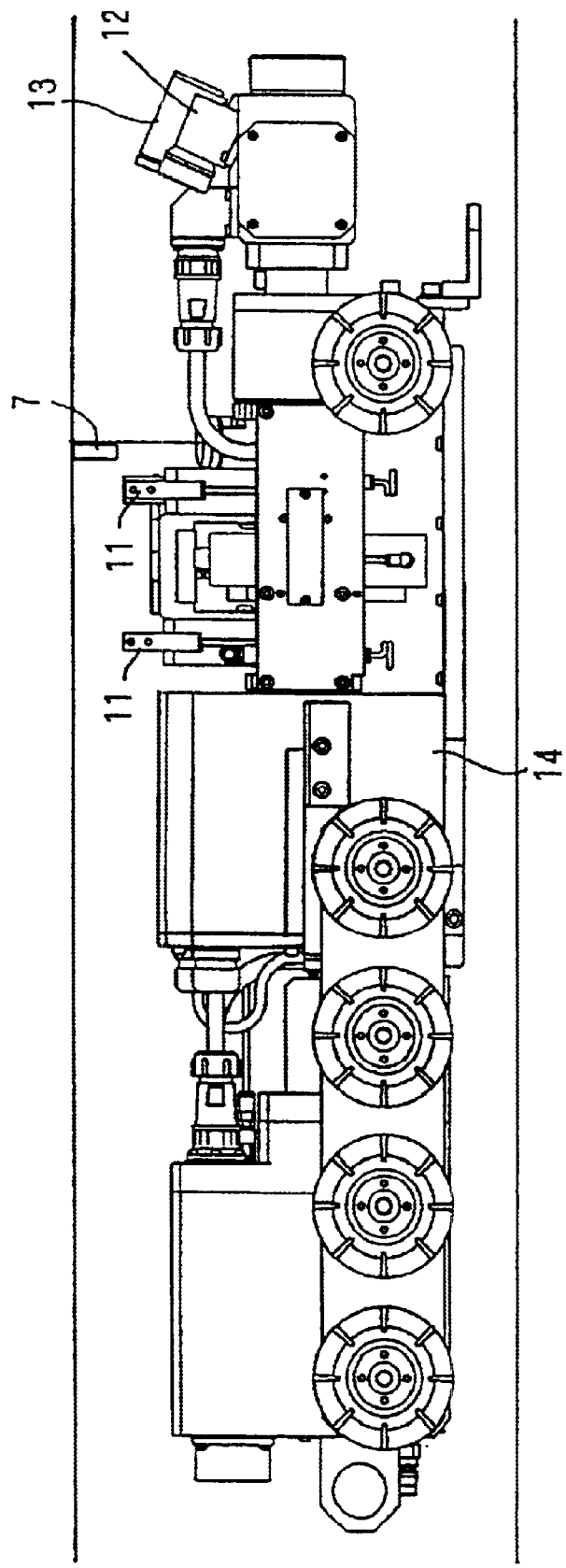
FIG. 3 is a side elevational view of a carriage, which is provided with a cable catcher and travels in a pipe.
Figure 4:
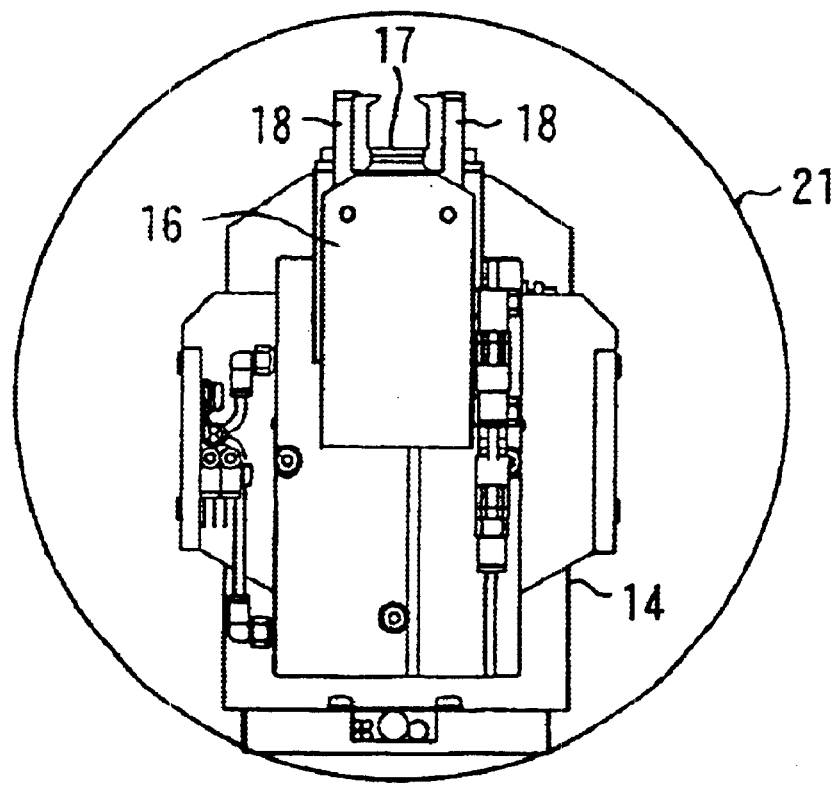
FIG. 4 is a detailed view showing the cable catcher.
Figure 5:
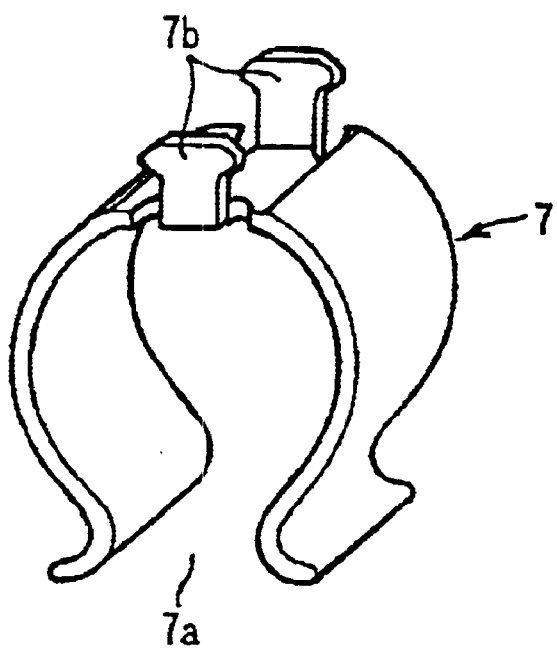
FIG. 5 is a perspective view of a cable holder according to the invention.

FIG. 3 shows a carriage 14 that incorporates a pair of cable catchers 11 with a fixed interval in the forward and backward direction, wherein the cable catchers 11 can be opened and closed, and elevated, and grasp a cable dragged into a pipe by its inlet opening and closing, and further push the cable in a cable holder 7 attached on the ceiling part of the pipe to be engaged therewith, and the carriage 14 includes, as in the above-described carriage 3, a light 12 that lights up the ceiling and a monitoring camera 13 that photographs the ceiling part of the pipe, which is illuminated by the light 12. As shown in FIG. 4 and FIGS. 9 through 11, respective cable catchers 11 includes a receiver 17 that is elevatable by a pneumatic cylinder 16 as in Japanese Unexamined Patent Publication No. 2001-28819, and an arm 18 that is provided at both sides of the receiver 17 and can be opened and closed by another pneumatic cylinder (not illustrated). The cable holder 7 shown in detail in FIG. 5 is formed by punching out a metallic sheet and folded so as to have a longitudinal section like an inverted pot with a narrowed inlet opening provided downward thereof, and the upper part thereof has a pair of claws 7b folded upward, which protrude upward with an fixed interval.

A cable is laid as shown below.

First, a carriage 3 is inserted into a sewage pipe 21 through a manhole and is remotely controlled and is caused to travel in the pipe. The carriage is caused to travel a fixed distance and stop. When stopping, a cable holder 7 that is shown in FIG. 5 is driven into the ceiling part of the pipe.

Figure 6:
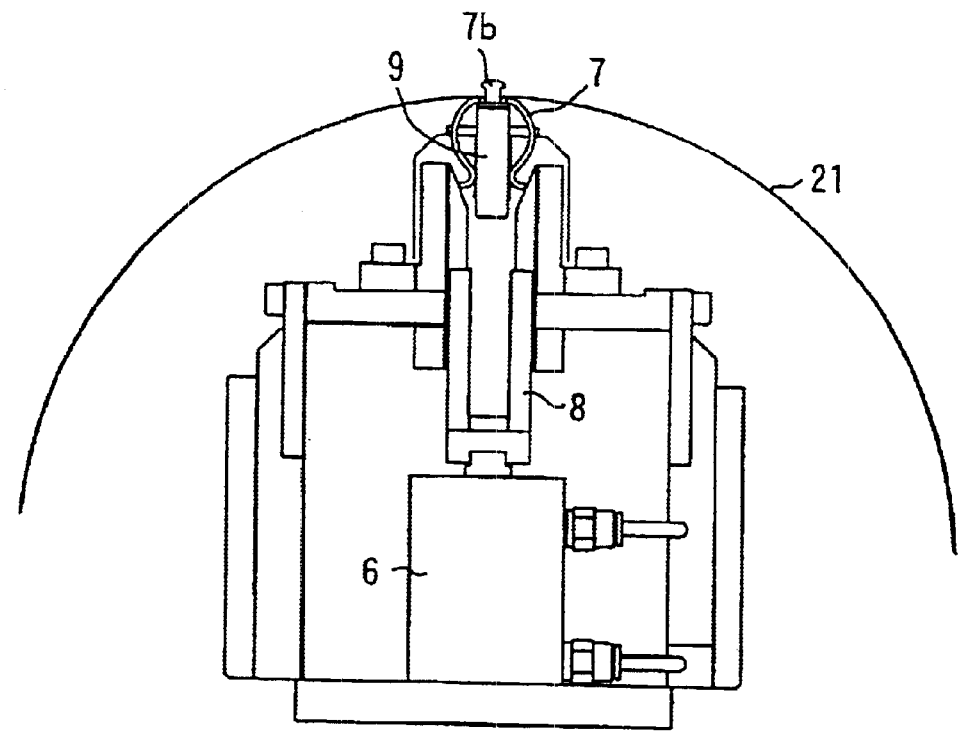
FIG. 6 shows a mode of pressure-fitting a cable holder shown in FIG. 5 into a resin pipe.
Figure 7:
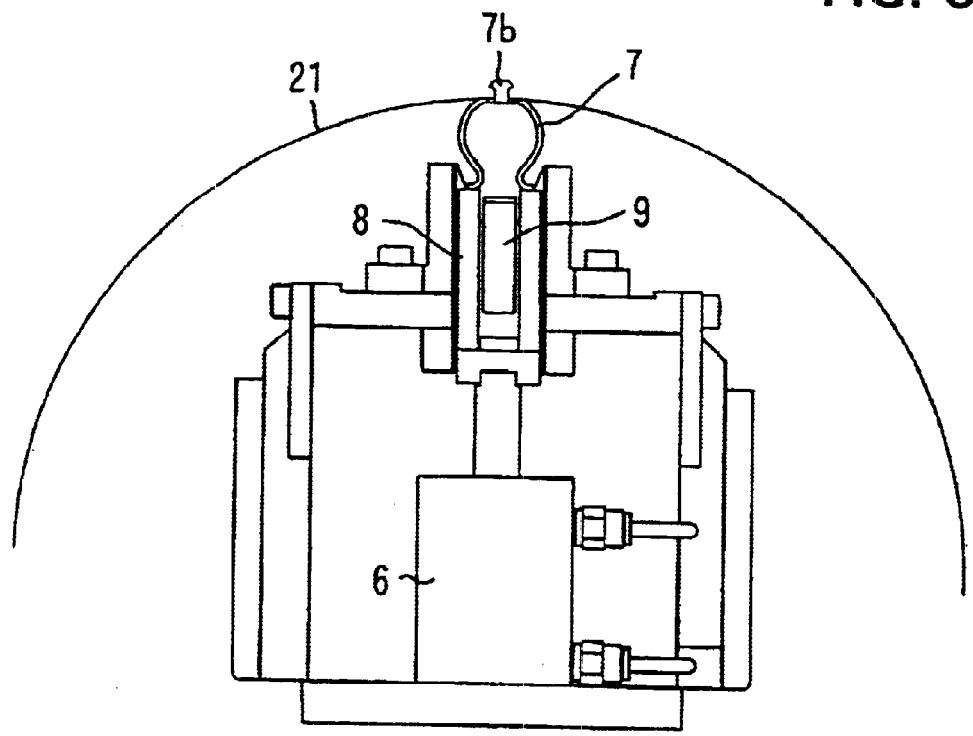
FIG. 7 shows a state where a cable holder pressure-fitted into a resin pipe is supported by a supporter.

That is, a striker 9 is pushed into the cable holder 7 that is pushed out by the cartridge 5 and supported by the supporter 8, and is elevated, wherein the claws 7b are driven into the ceiling part of a pipe. The striker 9 is heated by a heater (not illustrated), wherein the striker 9 heats the cable holder 7 when the cable holder 7 is pushed up. The claws 7b of the heated cable holder 7 heat and soften the resin to which the claws are pushed, and is pressure-fitted (FIG. 6). After that, as shown in FIG. 7, the supporter 8 is raised to support the cable holder 7 so as for the cable holder not to fall down when the striker 9 descends.

The cable holder 7 is supported for a fixed duration of time in a state where the supporter 8 is raised. After the cable holder is cooled down and fixed, the supporter 8 descends.

Figure 8:
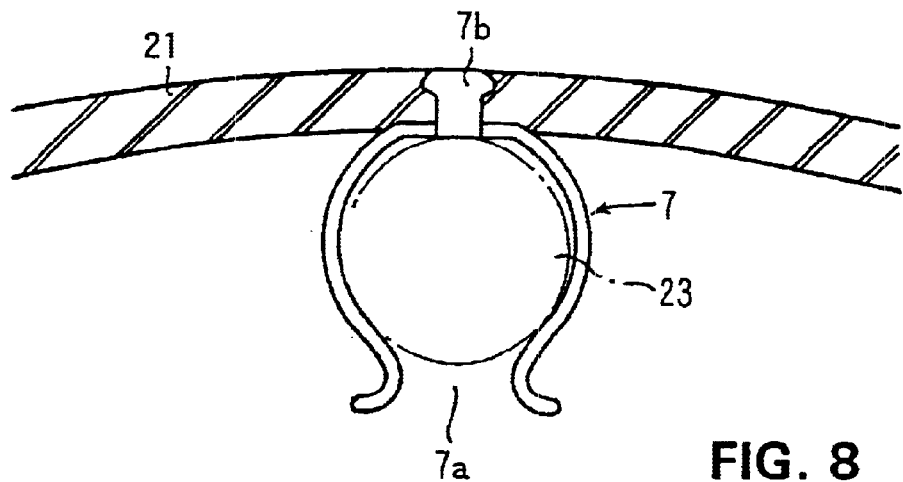
FIG. 8 is a front elevational view of a cable holder attached to the ceiling part of a pipe.

FIG. 8 shows the cable holder 7 that is fixed on the ceiling part of a pipe. While the cable holder 7 is being attached, an image picked up by the monitoring camera 2 is monitored by an external monitoring television set, wherein it is checked whether or not the cable holder 7 is correctly attached on the ceiling part. After the check is completed, the carriage 3 starts travelling, and repeats the above operation, thereby attaching cable holders.

After the cable holders 7 are attached on the ceiling part of a pipe at an adequate interval as described above, a lead wire is inserted into the sewage pipe through the manhole. After that, a cable 23 is coupled to the lead wire, and the cable 23 is dragged into the sewage pipe by pulling out the lead wire. The cable 23 may be dragged into the sewage pipe before attaching the cable holders.

Figure 9:
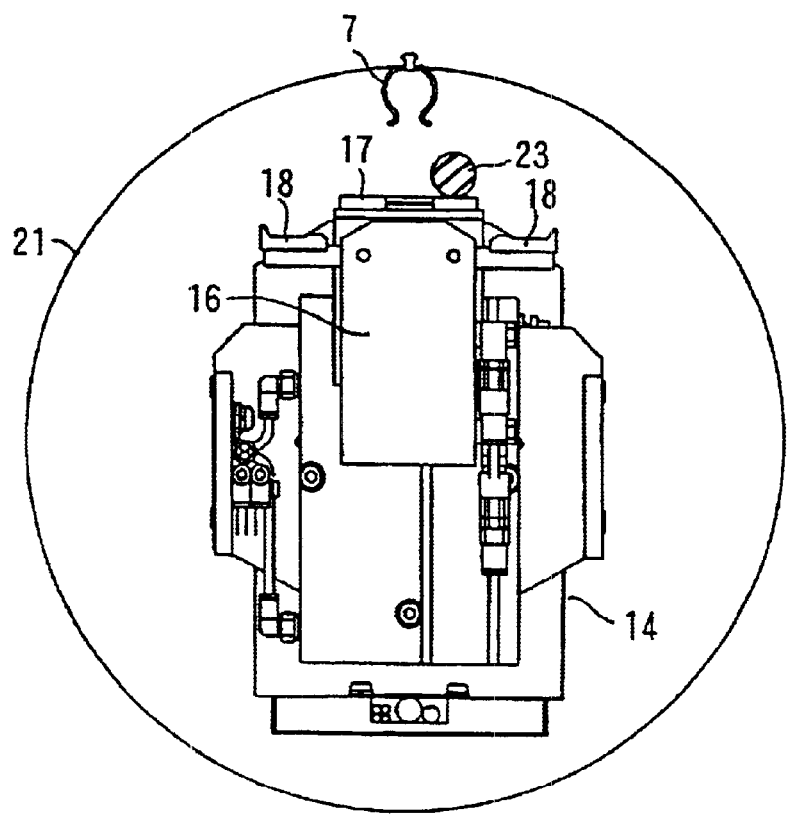
FIG. 9 show a state where a cable is received by a receiver.
Figure 10:
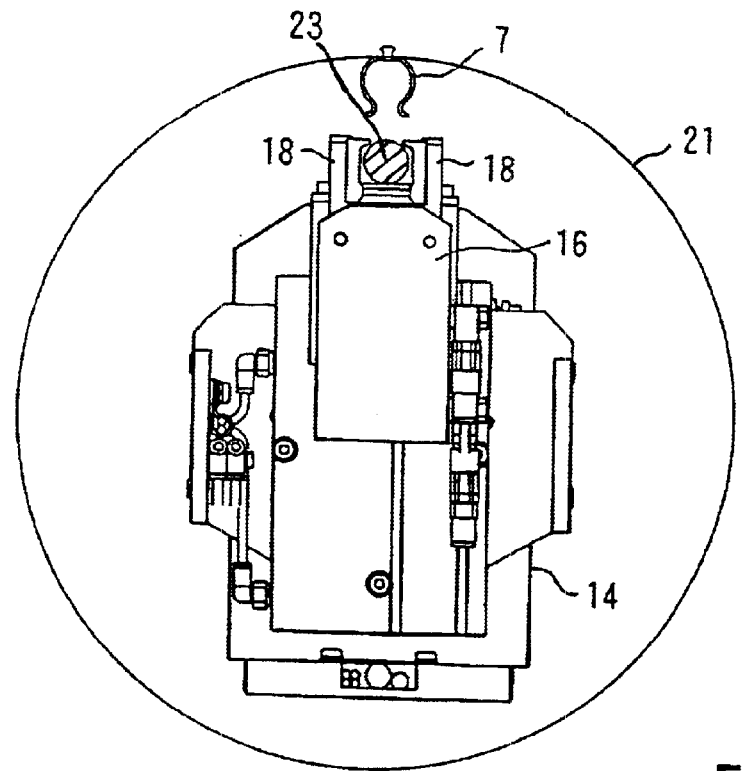
FIG. 10 shows a state where a cable is grasped by a receiver.
Figure 11:
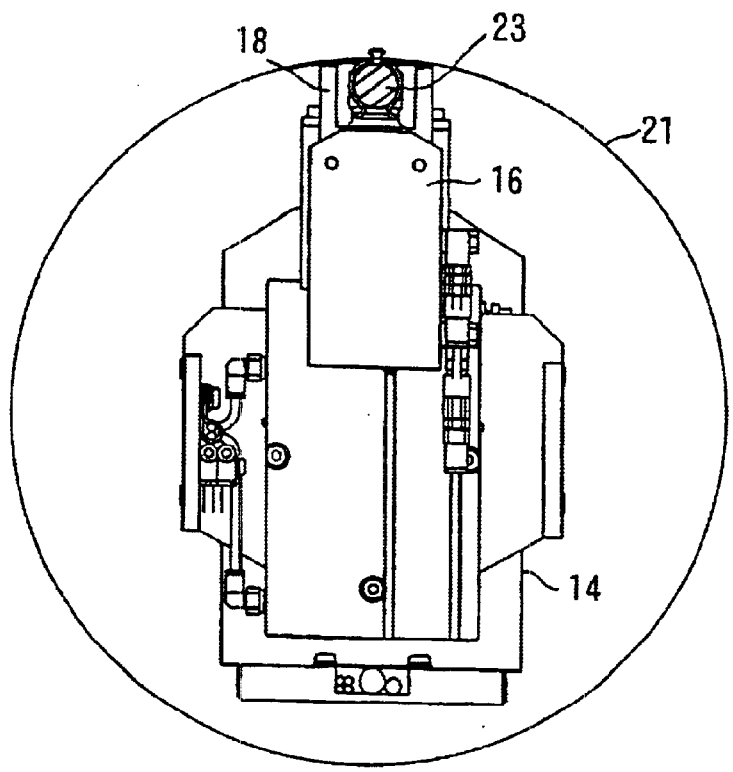
FIG. 11 shows a state where a cable is pushed in a cable holder.
Figure 12:
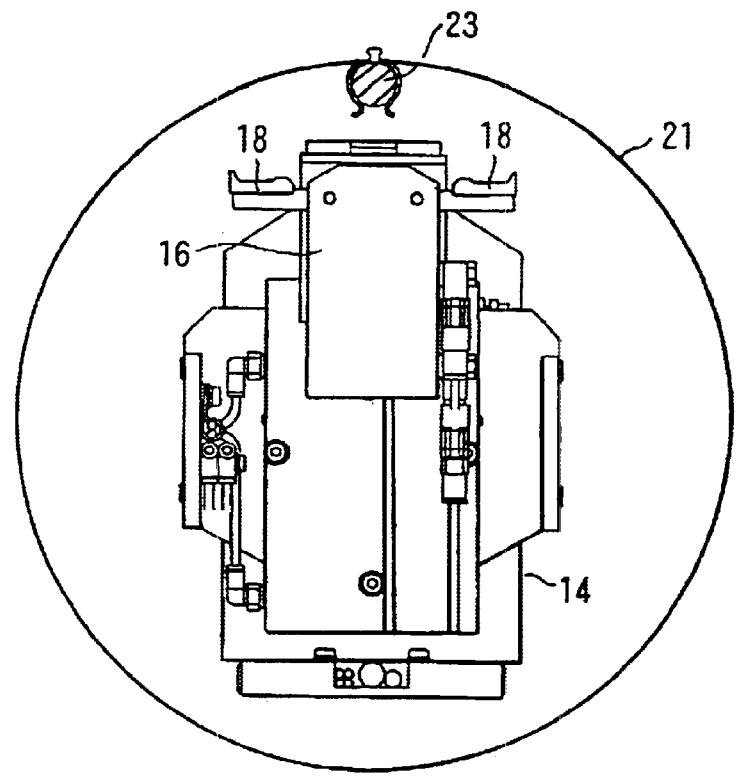
FIG. 12 shows a state where the cable catcher releases a cable.
Figure 13:
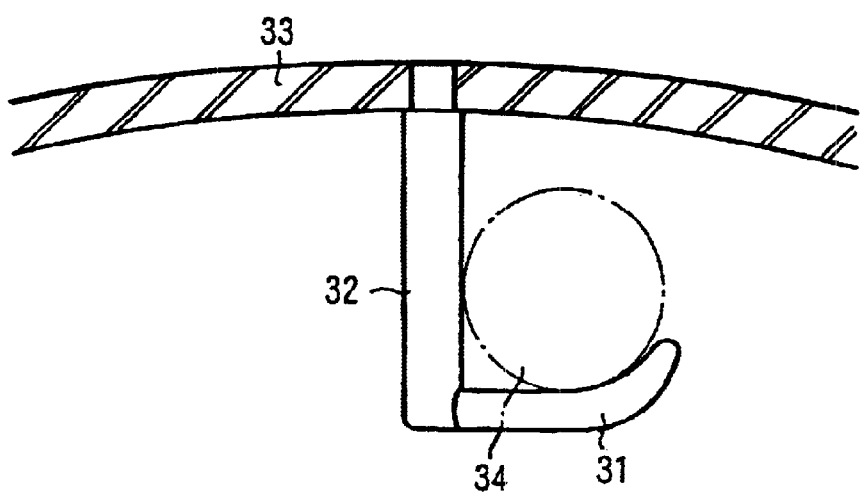
FIG. 13 is a front elevational view showing another example of a cable holder used in the invention.
Figure 14:
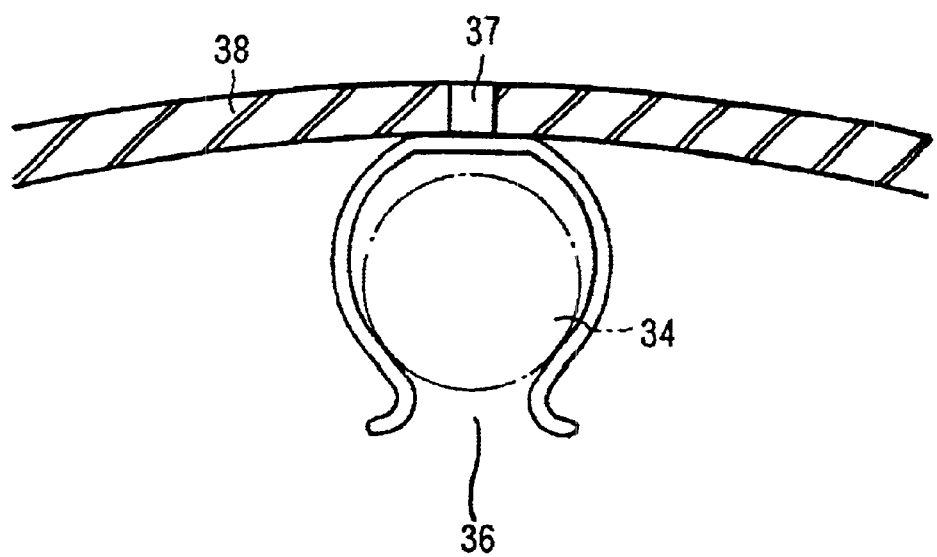
FIG. 14 is a front elevational view showing still another example of a cable holder used in the invention.

Next, a carriage 14 is inserted into a sewage pipe 21 through a manhole and is remotely controlled and caused to travel in the pipe. During the traveling, the ceiling part of a pipe, which is illuminated by a light 12 is photographed by a monitoring camera 13, and is monitored by an external monitoring television set. When cable holders 7 attached on the ceiling part of a pipe are found and confirmed, the carriage 14 stops, wherein the cable catcher 11 grasps a cable 23 and raises it. That is, the receiver 17 is raised to receive the cable 23 (FIG. 9). Further, the arm 18 is closed to grasp the cable 23 (FIG. 10). The receiver 17 is further raised and the raised cable 23 is pushed into the cable holder 7 through its inlet opening 7a and is engaged with the cable holder 7 (FIG. 11). After the cable is engaged with the cable holder 7, the arm 18 is opened to release the grasped cable 23, and the receiver 17 then descends (FIG. 12).

It is checked by the external monitoring television set that the cable 23 has been engaged with the cable holder 7. After the check is completed, the carriage 14 starts traveling again and repeats the above-described operation, wherein the cable 23 is attached to the respective cable holders 7.

As described above, the laying of the cable 23 in a sewage pipe is completed.

What is claimed is:

1. A method for attaching a cable to an inner wall of a resinous pipe, comprising the steps of:

providing a carriage for pulling the cable in the pipe, said carriage comprising means for holding a metallic cable holder and affixing an attaching portion of the cable holder to the inner wall of the resinous pipe, said cable holder additionally comprising a cable holder portion having a narrowed inlet opening and an expanded body;

affixing the cable holder attaching portion to the inner wall of the resinous pipe by bringing the attaching portion into contact with the pipe inner wall while the attaching portion is heated to embed the attaching portion therein;

allowing the cable holder to cool; and forcing a cable through the narrowed inlet opening of the cable holder portion so that the cable is held by the expanded body of the cable holder.

2. The method of claim 1, wherein the cable holder portion has a longitudinal cross-section similar to that of an inverted pot.

3. A resinous pipe and cable holder combination comprising a longitudinally extending resinous pipe and a metallic cable holder comprising an attaching portion and a cable holder portion, said attaching portion comprising claws embedded in an inner wall of the resinous pipe and arranged at a fixed interval in the axial direction of the pipe and said cable holder portion having a narrowed inlet opening provided opposite to the claws, an expanded body portion and a longitudinal cross-section similar to that of an inverted pot.

* * * * *